United States Patent
Brittingham et al.

(10) Patent No.: US 7,904,358 B2
(45) Date of Patent: Mar. 8, 2011

(54) COMPUTERIZED INTERFACE FOR MONITORING FINANCIAL INFORMATION AND EXECUTING FINANCIAL TRANSACTIONS

(75) Inventors: Brian S. Brittingham, New York, NY (US); Thomas Jessop, Garden City, NY (US)

(73) Assignee: Goldman Sachs & Co., New York, NY (US)

( * ) Notice: Subject to any disclaimer, the term of this patent is extended or adjusted under 35 U.S.C. 154(b) by 1544 days.

(21) Appl. No.: 09/796,570

(22) Filed: Feb. 28, 2001

(65) Prior Publication Data

US 2002/0120543 A1 Aug. 29, 2002

(51) Int. Cl.
*G06Q 40/00* (2006.01)
(52) U.S. Cl. .......................................... 705/35; 705/36 R
(58) Field of Classification Search .............. 705/35–37; 395/18; 707/102–105; 715/501
See application file for complete search history.

(56) References Cited

U.S. PATENT DOCUMENTS

| | | | | |
|---|---|---|---|---|
| 4,486,853 A | * | 12/1984 | Parsons ......................... | 345/418 |
| 4,868,866 A | * | 9/1989 | Williams, Jr. ......................... | 1/1 |
| 4,901,221 A | * | 2/1990 | Kodosky et al. .............. | 715/771 |
| 4,914,568 A | * | 4/1990 | Kodosky et al. .............. | 715/763 |
| 5,339,392 A | * | 8/1994 | Risberg et al. ................. | 715/762 |
| 5,615,306 A | * | 3/1997 | Bigus .............................. | 706/44 |
| 5,675,752 A | * | 10/1997 | Scott et al. ..................... | 715/866 |
| 5,806,071 A | | 9/1998 | Balderrama et al. | |
| 5,815,657 A | | 9/1998 | Williams et al. | |
| 5,852,435 A | | 12/1998 | Vigneaux et al. | |
| 5,892,905 A | * | 4/1999 | Brandt et al. ................... | 726/11 |
| 5,999,911 A | | 12/1999 | Berg et al. | |
| 6,026,417 A | | 2/2000 | Ross et al. | |
| 6,038,573 A | | 3/2000 | Parks | |
| 6,088,702 A | | 7/2000 | Plantz et al. | |
| 6,170,002 B1 | | 1/2001 | Ouchi | |
| 6,185,587 B1 | | 2/2001 | Bernardo et al. | |
| 6,216,237 B1 | * | 4/2001 | Klemm et al. .................. | 714/38 |
| 6,263,352 B1 | | 7/2001 | Cohen | |
| 6,304,886 B1 | | 10/2001 | Bernardo et al. | |
| 6,308,188 B1 | | 10/2001 | Bernardo et al. | |
| 6,393,456 B1 | | 5/2002 | Ambler et al. | |
| 6,466,654 B1 | * | 10/2002 | Cooper et al. ............. | 379/88.01 |

(Continued)

FOREIGN PATENT DOCUMENTS

JP 411250146 A1 9/1999

(Continued)

OTHER PUBLICATIONS

How technical editors enrich the revision process. Gerich, Carol, Technical Communication, vol. 41, No. 1, p. 59 (12). Feb. 1994.

(Continued)

*Primary Examiner* — Narayanswamy Subramanian
(74) *Attorney, Agent, or Firm* — Chadbourne & Parke LLP; Walter G. Hanchuk

(57) ABSTRACT

Apparatus, methods and articles of manufacture for monitoring financial information and executing financial transactions are disclosed. A client side interface comprises a number of panels, which are constructed byway of applications from various data sources. The panels can be customized as to content and appearance on the client, and the interface can be any one of a number of interfaces, including web pages, email interfaces and alert interfaces. The data sources are further provided, at least in part, by way of a value added content provider system, which comprises creating, editing and publishing interfaces.

20 Claims, 20 Drawing Sheets

U.S. PATENT DOCUMENTS

| | | | |
|---|---|---|---|
| 6,484,149 B1 | 11/2002 | Jammes et al. | |
| 6,546,397 B1* | 4/2003 | Rempell | 707/102 |
| 6,565,608 B1* | 5/2003 | Fein et al. | 715/501.1 |
| 6,643,663 B1 | 11/2003 | Dabney et al. | |
| 6,647,410 B1* | 11/2003 | Scimone et al. | 709/206 |
| 6,738,964 B1* | 5/2004 | Zink et al. | 717/105 |
| 6,867,789 B1* | 3/2005 | Allen et al. | 715/744 |
| 6,957,186 B1* | 10/2005 | Guheen et al. | 705/1 |
| 7,167,844 B1* | 1/2007 | Leong et al. | 705/80 |
| 7,287,230 B2* | 10/2007 | Austin et al. | 715/763 |
| 7,610,233 B1* | 10/2009 | Leong et al. | 705/37 |
| 7,627,517 B2* | 12/2009 | Badenhorst et al. | 705/37 |
| 2001/0051907 A1* | 12/2001 | Kumar et al. | 705/36 |
| 2002/0019810 A1 | 2/2002 | Kumar et al. | |
| 2002/0032655 A1 | 3/2002 | Antonin et al. | |
| 2002/0055909 A1 | 5/2002 | Fung et al. | |
| 2002/0062271 A1 | 5/2002 | Breuninger | |
| 2002/0070968 A1* | 6/2002 | Austin et al. | 345/764 |
| 2003/0151621 A1* | 8/2003 | McEvilly et al. | 345/744 |
| 2006/0200259 A1* | 9/2006 | Hoffberg et al. | 700/86 |
| 2006/0200260 A1* | 9/2006 | Hoffberg et al. | 700/86 |
| 2007/0043766 A1* | 2/2007 | Nicholas et al. | 707/104.1 |
| 2007/0162371 A1* | 7/2007 | Delf, Jr. | 705/35 |
| 2007/0162374 A1* | 7/2007 | Delf, Jr. | 705/36 R |
| 2007/0162375 A1* | 7/2007 | Delf, Jr. | 705/36 R |
| 2008/0066004 A1* | 3/2008 | Blevins et al. | 715/771 |
| 2008/0103989 A1* | 5/2008 | Lee | 705/36 R |
| 2009/0112719 A1* | 4/2009 | Bhave et al. | 705/14 |
| 2010/0004957 A1* | 1/2010 | Ball | 705/4 |

FOREIGN PATENT DOCUMENTS

WO    WO 00/65463    2/2000

OTHER PUBLICATIONS

International Search Report in PCT/US02/06025, mailed on Oct. 3, 2002.

International Preliminary Examination Report in PCT/US02/06025, dated Nov. 6, 2003.

* cited by examiner

Equities

Spotlight Ideas — Full View
Mon. Jan 20, 2001

Market Commentary — Full View
Mon. Jan 29, 2001 — Show Highlights

| Time | Headline |
|---|---|
| 2:59 pm | NASDAQ poised to break industry support at 1920 |
| 2:49 pm | Light short covering ahead of INTC Q2 earnings after the close today. |
| 2:29 pm | Despite rumors SEB1 management says CDO Paul Wahl not resigning |
| 2:00 pm | Boeing continued institutional flows into HLJH and E-Health names |
| 1:37 am | Market rumors of LU pulling orders from JDSU; currently 22% of JDSU revs |

More

Daily Research — Full View
Mon. Jan 29, 2001 — View: All of Today's Research

Alerts — Full View
Today | Research | Ideas | Markets

Mon. Jan 29, 2001 — Sort by: Priority

| Time | Alert | |
|---|---|---|
| 12:20 pm | Want specs q/revenues 12–15 pck below SBB. 5min seen in Q2 | ☑ |
| 3:20 pm | July lodging Stats—Supply in check but significant demand slow down | ☐ |
| 9:10 am | Price Alerts TIBEW up 4 5/8 to $101.63 | ☑ |
| 9:10 am | British Pound Weakness: US Multinationals with the most Earnings Risk | ☑ |
| 9:10 am | PCIN…Internet Perspectives | ☑ |

Hide Selected — 1 | 2 | 3 | 4

Markets at a Glance
View: Equity Markets

| | Last | Net Chg | Pct Chg | Time |
|---|---|---|---|---|
| S&P | 1318.55 | ⇩ −8.27 | −0.83% | 09:56 |
| D1DA | ±0525.38 | ⇩ −84.17 | −0.80% | 09:56 |
| Nasdaq | 2626.50 | ⇩ −14.07 | −0.54% | 09:56 |
| DAM | 8002.17 | ⇧ +18.33 | 0.48% | 09:56 |
| FTSE | 6165.50 | ⇧ +50.60 | 0.82% | 09:56 |
| Nikkei | ±3347.74 | ⇧ +148.67 | 1.10% | Close |
| Hang Seng | ±5295.42 | ⇧ +204.65 | 1.34% | Close |

Event List — Full View
Go to: US Economic Events

Mon. Jan 29, 2001
- All Day — Economic Conference Minneapolis
- 8:30am — PP1=Ex Food & Energy
  - Forcast: +0.3%
  - Previous: +0.4%
  - Consensus: +0.3%
- 9:15am — Investor Conference call Minneapolis/Chicago/Milwaukee
- 10:30am — WTI Futures/Options Expirations Current Price $88 12/bbl
- 12:00am — Investor Luncheon–Chicago

Tues. Jan 30, 2001
- All Day — Investor Breakfast Minneapolis
- 8:30am — PP1=Ex Food & Energy
  - Forcast: +0.3%
  - Previous: +0.4%
  - Consensus: +0.3%

| Alerts | Symbol | Price | Net Change | % Change | Volume | 52 Week High | 52 Week Low | Quantity | Bid Size |
|---|---|---|---|---|---|---|---|---|---|
| N I R T | CTLM | 51.75 | -1.22 | +1.4% | 123,000 | 98.75 | 19.75 | xxx | xxx |
| N I R T | GE | 50.15 | +1.2 | +0.2% | 2,223,000 | 75.75 | 35.75 | xxx | xxx |
| N I R T | T | 39.55 | -1.87 | +2.3% | 5,054,345 | 67.98 | 32.12 | xxx | xxx |
| N I R T | VIGN | 42.12 | +3.2 | +4.1% | 1,244,000 | 102.33 | 21.22 | xxx | xxx |
| N I R T | ELNT | 87.79 | -1.99 | +1.2% | 453,000 | 97.21 | 13.23 | xxx | xxx |
| N I R T | AOL | 51.75 | +1.87 | +3.3% | 11,982,021 | 112.15 | 39.75 | xxx | xxx |
| N I R T | VERT | 49.87 | +1.30 | +3.3% | 2,123,123 | 132.87 | 21.33 | xxx | xxx |
| N I R T | REMD | 42.33 | +1.24 | +2.5% | 4,444,000 | 134.88 | 34.55 | xxx | xxx |
| N I R T | TIBX | 108.28 | | | 569,000 | 112.11 | 51.75 | xxx | xxx |
| N I R T | DIS | 32.00 | +1.54 | +2.8% | 2,345,999 | 55.33 | 29.39 | xxx | xxx |
| N I R T | NVDA | 65.47 | | | 923,000 | 103.87 | 42.98 | xxx | xxx |
| N I R T | LU | 50.45 | +1.55 | +1.3% | 7,987,211 | 77.82 | 43.22 | xxx | xxx |
| N I R T | GS | 143.22 | | | 6,232,864 | 155.95 | 51.75 | xxx | xxx |
| N I R T | C | 43.99 | +1.44 | +2.3% | 1,999,111 | 87.43 | 32.75 | xxx | xxx |
| N I R T | ALTR | 60.54 | | | 2,765,900 | 76.75 | 28.64 | xxx | xxx |
| N I R T | EBAY | 54.89 | +1.23 | +1.2% | 3,456,000 | 97.75 | 32.09 | xxx | xxx |
| N I R T | RRRR | 11.21 | | | 787,098 | 92.12 | 7.22 | xxx | xxx |

Watchlist Mini-Browser
Select Watchlist/Heatmap  Portfolio 1
September 22, 2000
View  Summary
Expanded View ● Red//Green
○ Blk//Yellow DJIA: 11027.25 +65.57 up 0.62%
S&P 500: 1554.22 +12.67 up 0.56%
NASDAQ: 4110.88 -52.98 down 1.27%

RESEARCH

08/28 2:44pm    XYZ Company Page
                 Generic description of Company Pages Generic description of Company Pages 09/02 8:53am    Heading Heading Heading Heading Heading Heading
                 Summary summary summary summary summary summary summary summary summary summary summary summary summary summary summary summary summary summary 08/22 3:27pm    Heading Heading Heading Heading Heading Heading
                 Summary summary summary summary summary summary summary summary summary summary summary summary summary summary summary summary summary 07/08 11:32am    Heading Heading Heading Heading Heading Heading
                 Summary summary summary summary summary summary summary summary summary summary summary summary summary summary summary summary summary 05/12 5:21pm    Heading Heading Heading Heading Heading Heading
                 Summary summary summary summary summary summary summary summary summary summary summary summary summary summary summary summary summary

*n* more..    Advanced Search

IDEAS

*Ideas disclaimer Ideas disclaimer Ideas disclaimer Ideas disclaimer Ideas disclaimer Ideas disclaimer*

09/10 7:22am    Heading Heading Heading Heading Heading Heading
                 Summary summary summary summary summary summary summary summary summary summary summary summary summary summary summary summary summary 09/02 8:53am    Heading Heading Heading Heading Heading Heading
                 Summary summary summary summary summary summary summary summary summary summary summary summary summary summary summary summary summary 08/22 3:27pm    Heading Heading Heading Heading Heading Heading
                 Summary summary summary summary summary summary summary summary summary summary summary summary summary summary summary summary summary Advanced Search

MARKETS

09/10 7:22am    Heading Heading Heading Heading Heading Heading
                 Summary summary summary summary summary summary summary summary summary summary summary summary summary summary summary summary summary 09/02 8:53am    Heading Heading Heading Heading Heading Heading
                 Summary summary summary summary summary summary summary summary summary summary summary summary summary summary summary summary summary 08/22 3:27pm    Heading Heading Heading Heading Heading Heading
                 Summary summary summary summary summary summary summary summary summary summary summary summary summary summary summary summary summary 07/08 11:32am    Heading Heading Heading Heading Heading Heading
                 Summary summary summary summary summary summary summary summary summary summary summary summary summary summary summary summary summary 05/12 5:21pm    Heading Heading Heading Heading Heading Heading
                 Summary summary summary summary summary summary summary summary summary summary summary summary summary summary summary summary summary

*n* more..    Advanced Search

FIG.20

| Alerts | | | Full View |
|---|---|---|---|
| Today | Research | Ideas | Markets |

Mon. Jan 29, 2001                                    Sort by: [Priority ▽]

| | | |
|---|---|---|
| 12:20 pm | Want specs q#revenues 12-15 pck below S88. 5min seen in O2 | ☑ |
| 3:20 pm | July lodging Stats— Supply in check but significant demand slow down | ☐ |
| 9:10 am | Price Alerts TIBEW up 4 5/8 to $101.63 | ☑ |
| 9:10 am | British Pound Weakness: US Multinationals with the most Earnings Risk | ☑ |
| 9:10 am | PCIN...Internet Perspectives | ☑ |

Hide Selected                                            1 | 2 | 3 | 4

FIG.22

COMPUTERIZED INTERFACE FOR MONITORING FINANCIAL INFORMATION AND EXECUTING FINANCIAL TRANSACTIONS

The present invention relates to apparatus, methods and articles of manufacture for monitoring financial information and executing financial transactions. More specifically, the present invention relates to improvements in interface apparatus, methods, and articles of manufacture, for monitoring financial information and executing financial transactions within a networked environment.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Financial data is provided in a number of forms. Data such as stock prices, price movements, trading volume, percentage change in price, etc. are available to the financial or investment professional. These data or information feeds, however, commonly are so numerous as to be overwhelming. Some data visualization tools permit assimilating, joining and reviewing these feeds. However, the data visualization tools that exist are typically independent in function and utility. Therefore, the user is forced to use the existing data visualization tools singly or in an otherwise less than desirable manner, which may detrimentally affect the user's ability to monitor and execute financial transactions including trading strategies. For example, specific trading strategies may be constructed and executed on the basis of data feeds, yet if the data cannot be usably understood, the strategies may be detrimentally affected.

The data visualization tools that exist also are often relatively static and inflexible. That is, in most instances, data visualization tools are based upon customized implementations for receiving specific data feeds, and each new implementation may require new programming with attendant programming cost and time.

More recently, the art has attempted to provide enhanced data visualization interfaces known as "graphic user interfaces" or "GUIs." A graphic user interface provides an interface to a local or networked environment which permits a user to graphically review data, select depicted objects and manipulate applications corresponding to those objects. While the aforementioned GUIs may provide an interface for monitoring and executing financial transactions, there is a need for convenient and flexible integrated visualization tools for monitoring and execution of financial transactions in a graphic user interface.

Even with the aforementioned GUI's, the art is further limited in having different interfaces for different users. For example, financial professionals such as institutional or professional traders, analysts, etc. often encounter different interfaces to a financial institution. A single interface, customizable by type of financial professional, would provide a consistent institutional presence to the public, thus benefiting the institution and providing the public with the convenience of a single interface.

Moreover, GUI's may at times be inaccessible or of limited use to the financial professional. Yet other interfaces might well lack the sophistication or ease of use of a GUI. Additionally, the professional may well have become used to a particular interface as an information provider. Yet the prior art lacks convenient delivery mechanisms across a number of interfaces for financial information.

Therefore, it is an object of the present invention to provide convenient, customizable, financial information interfaces.

It is a further object to provide such interfaces in more than one delivery mechanism, such as through a GUI, email and alerts.

It is a further object to provide such interfaces implemented in a networked environment such as the Internet.

It is a further object of this invention to provide apparatus, systems and articles of manufacture for integrated interfaces for data visualization.

It is a further object of this invention to provide a convenient, flexible and integrated graphic user interface for monitoring financial information and executing financial transactions in a networked environment.

BRIEF DESCRIPTION OF THE DRAWINGS

FIG. 6 shows an interface of a preferred embodiment.
FIG. 8 shows an interface of a preferred embodiment.
FIG. 12A shows an interface of a preferred embodiment.
FIG. 16 shows an interface of a preferred embodiment.
FIG. 20 shows an interface of a preferred embodiment.
FIG. 22 shows an interface of a preferred embodiment.

SUMMARY OF THE INVENTION

The present invention provides apparatus, methods and articles of manufacture for integrated data visualization. Delivery systems and interfaces such as graphic user interfaces for monitoring financial information and executing financial transactions, email interfaces using customizable parameters, and alert mechanisms used in a networked environment, are shown.

The preferred embodiments comprise a client side interface with networked connection, which in the especially preferred embodiments is a web browser with Internet access. The interface integrates data tools, which are customized to the particular user. The data tools are applications that are executed on the server or client side. In the preferred embodiments, Java applets or servlets are used, although, of course, other applications known in the art may be used. These data tools function as filters to present data in preselected categories through a number of data interfaces, as well as provide the user, in some instances, with transaction execution ability. The client also may be provided with an email user interface configured with at least some of the same customization parameters as the client's customized GUI. Additionally, the client may receive alerts, of subjects that he or she has already indicated an interest in during the customization process for the GUI, as he or she peruses the GUI.

The preferred embodiments also comprise a server side, which provides data feeds to the client's graphic user interface, email interface and/or alerts. These data feeds may be any of a number of different types, including but not limited to manually edited content, automated content, etc.

DETAILED DESCRIPTION OF THE INVENTION

Figure 1:
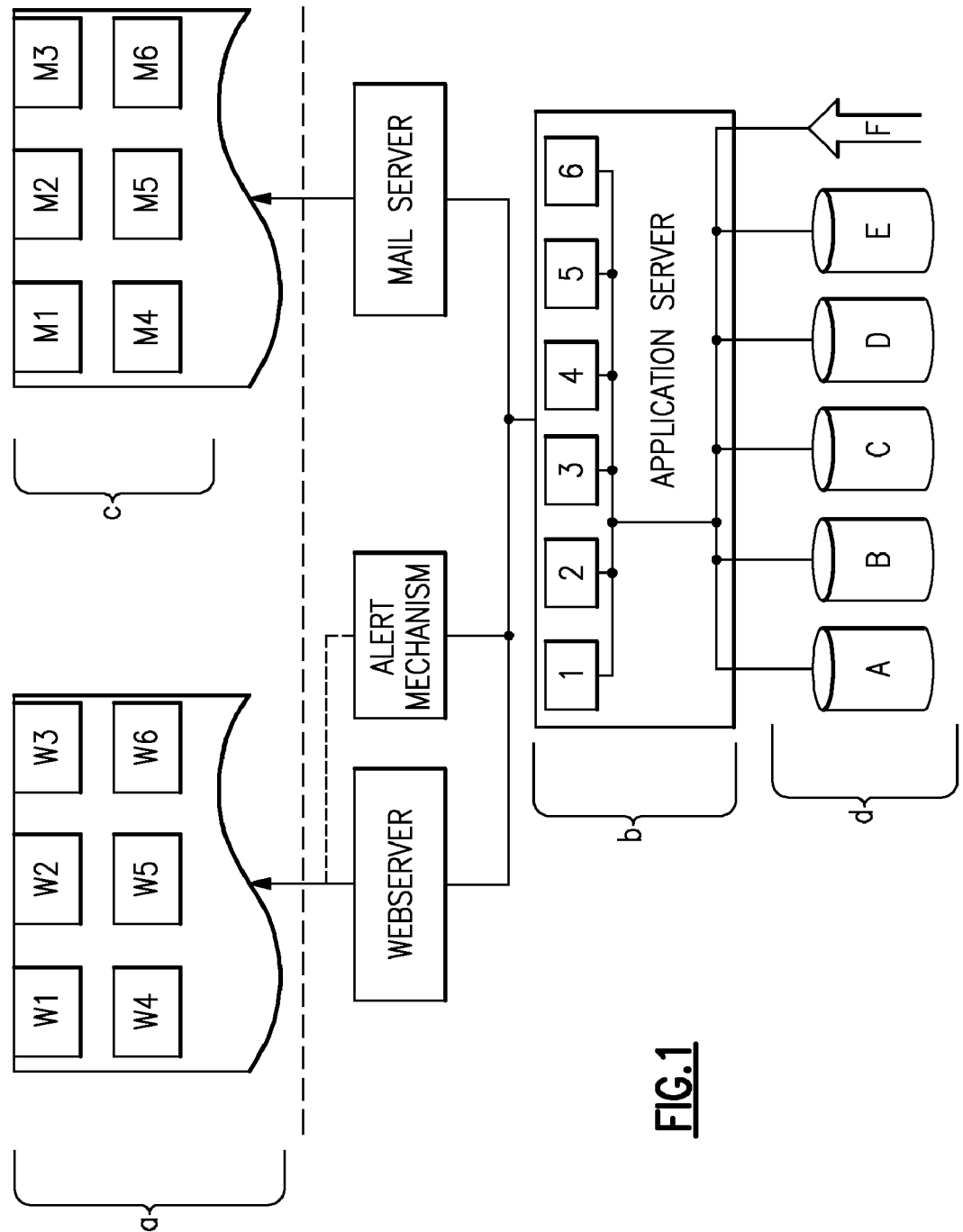
FIG. 1 shows a schematic diagram of a preferred embodiment.

FIG. 1 shows a schematic diagram of an embodiment of the present invention. Shown generally at a is a web page graphic user interface containing an integrated set of web "panels," identified as W1-W6. These web panels each provide categories of facilities and/or information of interest to the financial services professional, such as Research information, Event information, Markets/News information, Trading facilities and/or information, and Deals information, so, for example, panel W1 may be a Research information panel, panel W2 may be a Event information panel, etc. The web page panels W1-W6 comprise a Website, which is constructed, via a Web server, from an application server, shown generally at b, and "generic" panels 1-6. The generic panels provide non customized default panels, which are provided to the Web server, which, in turn constructs the specific embodiments of the generic panels 1-6, seen as Web page panels W1-W6.

The choice of which panels to use is made, in part, by the user during a personalization or customization process, as is explained in further detail below. (The words "customization" and "personalization," and their variants, are used interchangeably herein.) The number of panels that can be requested by the user varies according to the customization parameters, and the use of panels as numbered here is meant only to serve as an illustrative example of possible panels, not serve as a limitation on all available panels. Some panels are mandatory and will appear on all users' GUI's regardless of customization settings.

Shown generally at c of FIG. 1 is an email interface containing an integrated set of "panels," identified as M1-M6. As with the web panels provided through the Web page interface described above, these email panels each provide categories of facilities and/or information of interest to the financial services professional, such as Research information, Event information, Markets/News information, Trading facilities and/or information, and Deals information, so, for example, panel M1 may be a Research information panel, panel M2 may be a Event information panel, etc. The email panels M1-M6 are constructed, via an email server, from an application server, shown generally at b, and "generic" panels 1-6.

The choice of which panels to use may be made, in part, by the user during a personalization or customization process, as is explained in further detail below. (The words "customization" and "personalization," and their variants, are used interchangeably herein.) The number of panels that can be requested by the user varies according to the embodiment, and the use of panels as numbered in the embodiment of FIG. 1 is meant only to serve as an illustrative example of possible panels, not serve as a limitation on all available panels. Other preferred embodiments provide only limited personalization for email panels, as is further described below.

An Alert server is also shown in FIG. 1. This server provides one or more Alerts—which comprise a separate interface implemented within the GUI interface—to the user as he or she is browsing the web site. In the especially preferred embodiments, these Alerts are configured using the same or similar customization parameters as were used for the web page, as is explained in further detail below.

The description of the embodiments herein uses Web terminology. However, it should be specifically understood that embodiments can be implemented in environments that support GUI and other interfaces, including but not limited to Microsoft Windows® NT, Windows® 2000, Windows®95, 98 and Me, Unix® and Unix®-like platforms, including but not limited to Linux® and its variants, as well as other operating system platforms including but not limited to IBM OS/390, MacOS, VxWorks® and others.

FIG. 1 also shows generally at d raw data source databases A through E and raw data source F. Data sources A-F comprise the data feeds for panels 1 through 6. Data sources A-F receive their data from various sources, e.g., market data feeds, financial information providing historical data resources, data feeds for particular financial instruments, etc. The number of sources that will be used varies according to the particular embodiment, and the use of those sources identified here is meant only to serve as an illustrative example of some possible sources, not serve as a limitation on all possible sources.

In the preferred embodiments, the sources are not offered in one-to-one relationship to the panels. Rather, the sources may be deconstructed or mixed into various feeds, such as is shown schematically at the application server of FIG. 1 so that the sources A-F result in data panels 1-6.

The deconstruction or mixing into various feeds of the data sources is accomplished by tools customized to the particular user. The tools are applications that are executed on the server or client side. In the preferred embodiments, Java applets or servlets are used as tools, although, of course, other applications known in the art may be used. These tools function as filters to present data in preselected categories through a number of interfaces or panels.

Additionally, a source may be reused at various web pages throughout the site, so that the information contained in any particular source may be duplicated throughout the web site as desired, mixed with various sections of the email delivery system, comprise an Alert provided to users, etc.

The data sources are provided in various ways. Some sources are those offered by external providers, such as stock prices. Other feeds are provided through content providers and editors, such as the value added content panels seen in the especially preferred embodiments. The value added content delivery panels are provided through a server side value added content delivery system. This system provides materials such as commentaries on United States, European and Asian equity markets, particular instruments, etc. as will now be described.

The value added content delivery system obtains contributions from content providers. Those contributions are in turn directed to an editor and sent from the editor to the servers for use in various panels. The value added content system of the preferred embodiment permit creating, editing, and publishing content, by use of consistent template interface designs. These consistent interfaces provide convenient usability across a number of content providers, electronic routing to streamline workflow and facilitate rapid time-to-publish, as well as security for the documents through control versions, control work flow, etc. The system also provides for convenient retrieval, removal and replacement of content from the interface and servers as desired.

Figure 2:
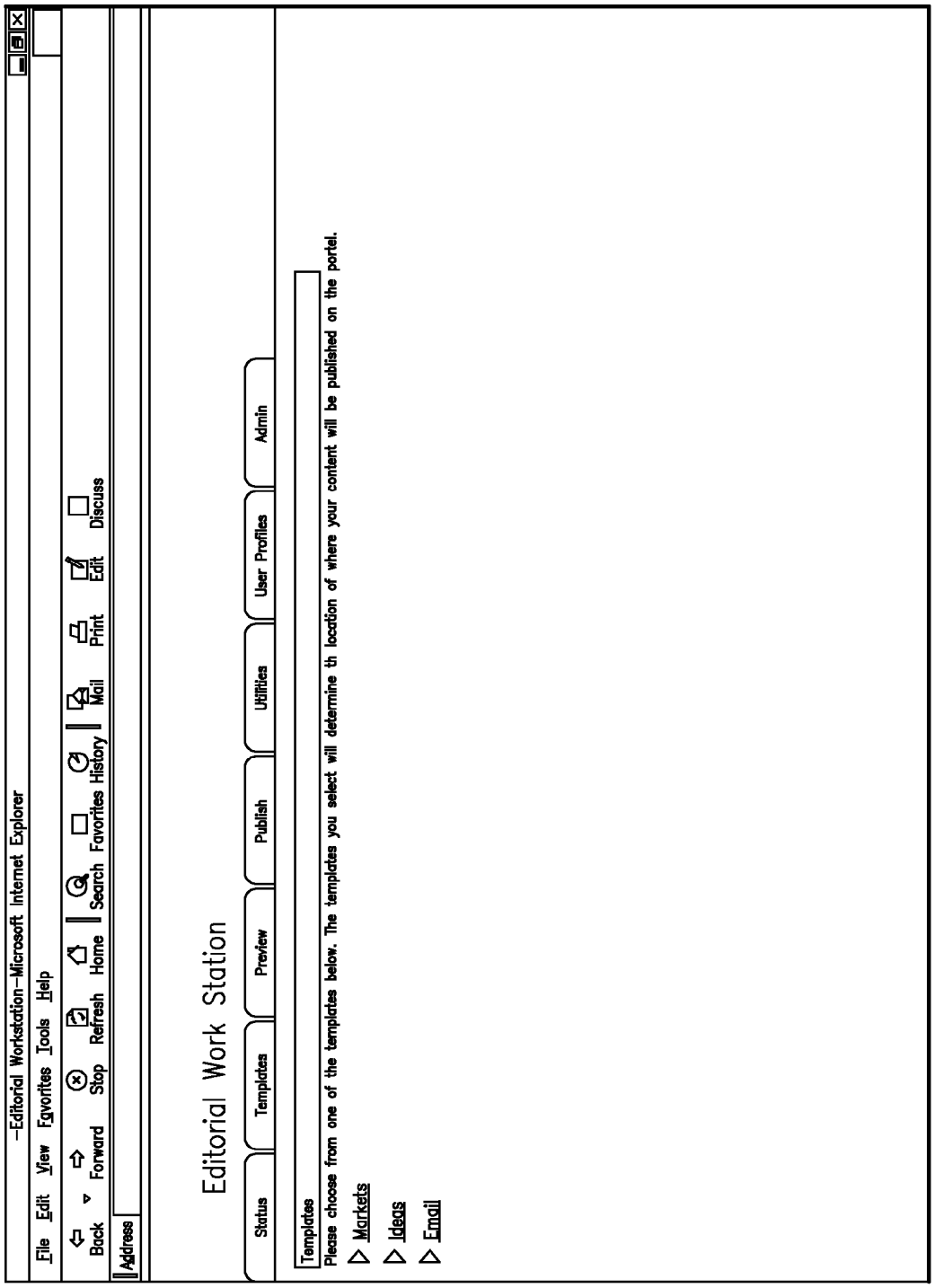
FIG. 2 shows an interface of a preferred embodiment.

The content provider uses, in the preferred embodiment, an interface like that seen at FIG. 2. The interface provides a number of interface options for the content provider, which the provider can reach by clicking on the tabs. FIG. 2 shows one such choice, the Templates tab. This and other interface options will now be described.

Figure 3:
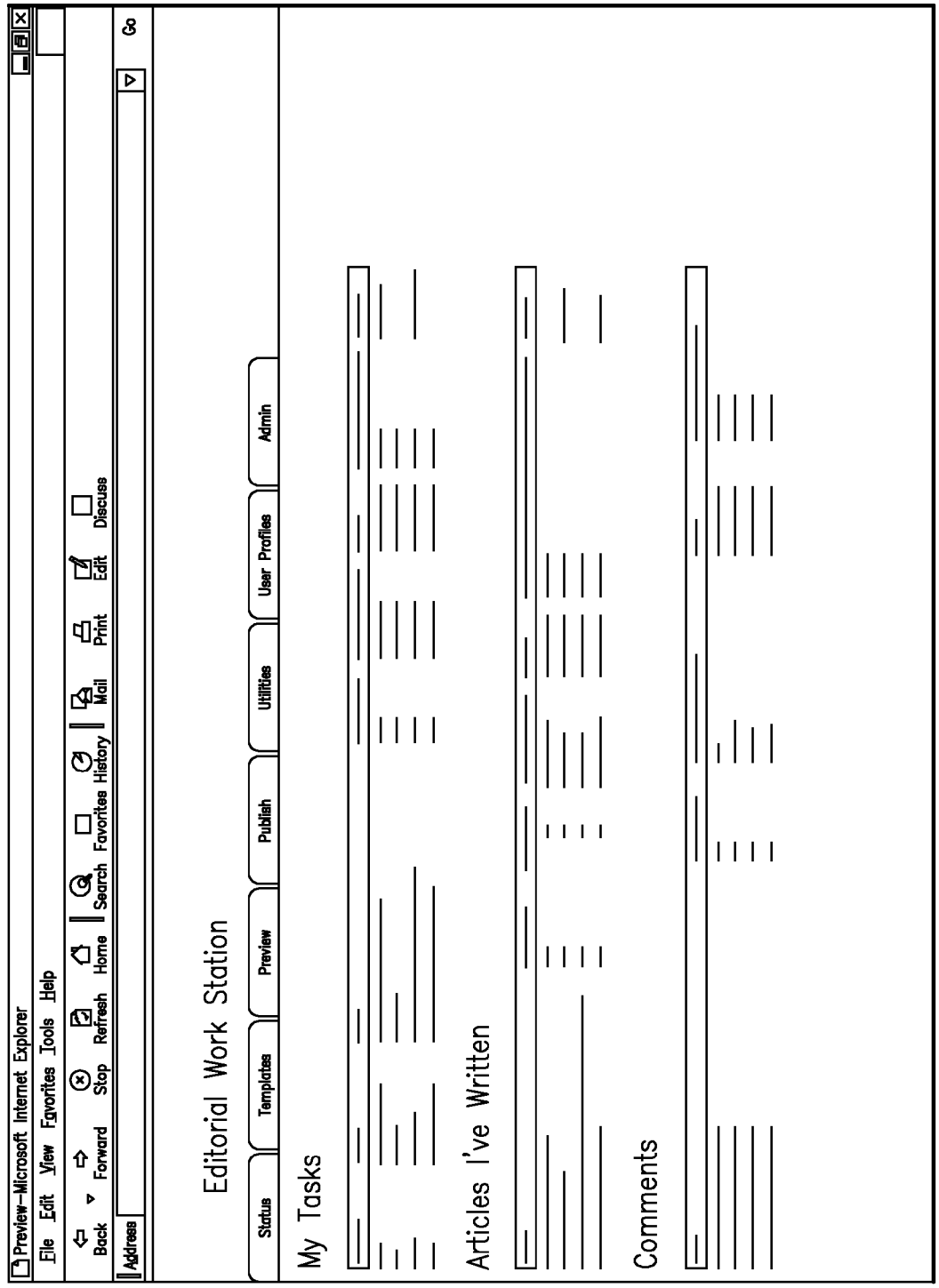
FIG. 3 shows an interface of a preferred embodiment.

The Status Tab. The tab labeled "Status" provides one or more status screens are provided for contributors and editors in order to maintain and review content contributions. For example, FIG. 3 is an example of a status screen interface for the content provider, and can be reviewed by a contributor or an editor, so that an orderly flow of content can be achieved. In the preferred embodiments the content may be removed from the web site because of accuracy concerns, regulatory concerns and the like. The status screen interface will alert the editor and/or the content provider that the articles have been removed through notification in the "My Tasks" section of the status screen. This will also provide content providers with deadline information.

Figure 4:
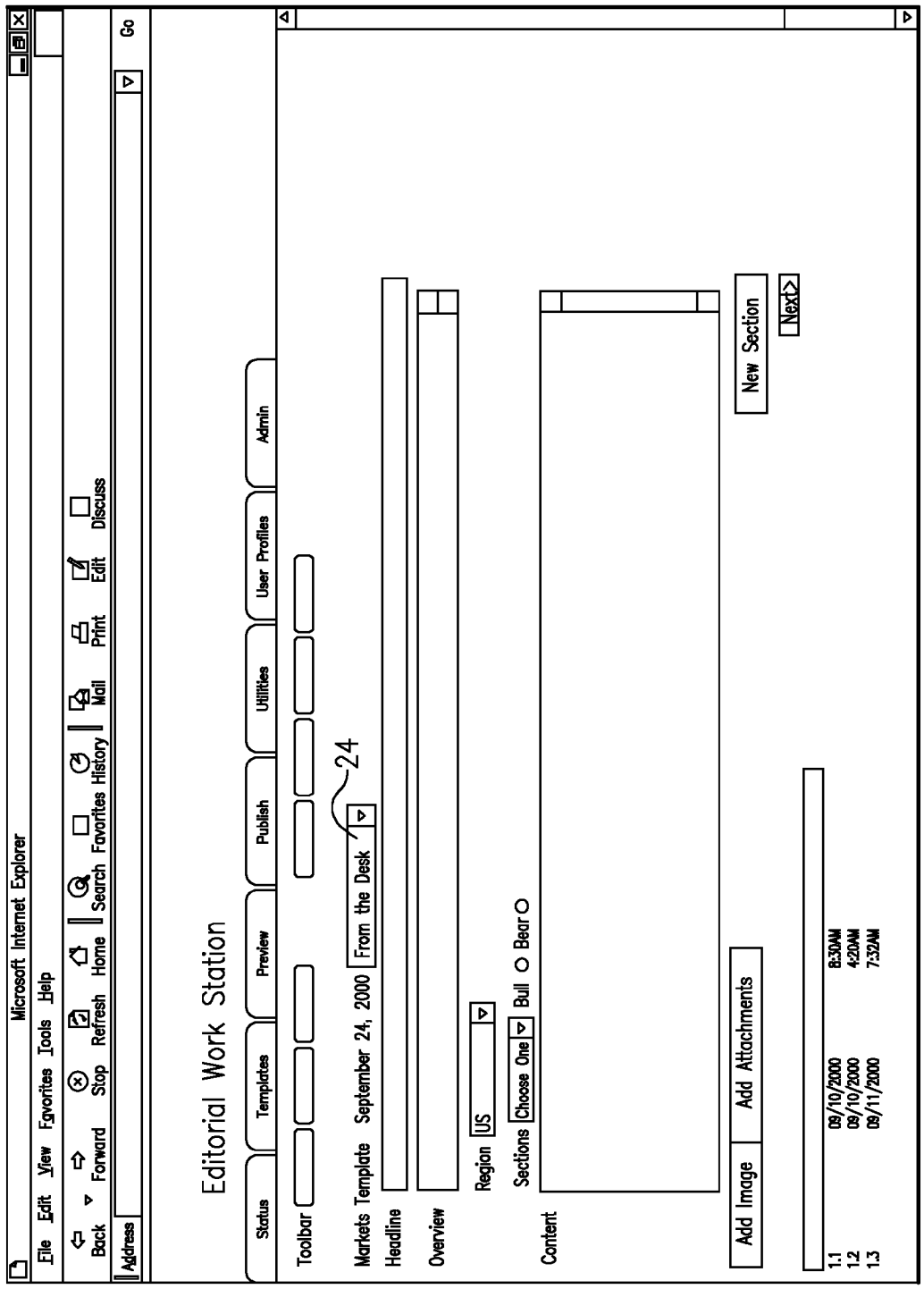
FIG. 4 shows an interface of a preferred embodiment.

The Templates Tab. The tab labeled "Templates" provides a number of templates for the panels that may be provided with content in this embodiment. In the interface example of FIG. 2, templates are available for the Markets and Ideas panels, as well as for the email interface. Of course, other panels may be provided with content in other embodiments. Selection of the available templates, under the Templates tab, will bring up a template formatted for the particular panel. For example, FIG. 4 shows an example of the Market template, which is used to add content to a Market panel. Various options are seen for customizing the placement of the content within the Market panel, including placement on sub panels such as a "From the Desk" sub panel seen in the drop down box 24, etc. In other embodiments, of course, any panel may include value added content, and so templates may be used in order to assist supplying that content. Additionally, the preferred embodiments permit tagging while writing content, or editing content, for hyperlinks or other links to specific information. In the especially preferred embodiment, company, sector and analyst specific information is tagged for hyperlinking through an affirmative act by the content provider, e.g. pressing the "Next" button seen in FIG. 4.

Figure 5:
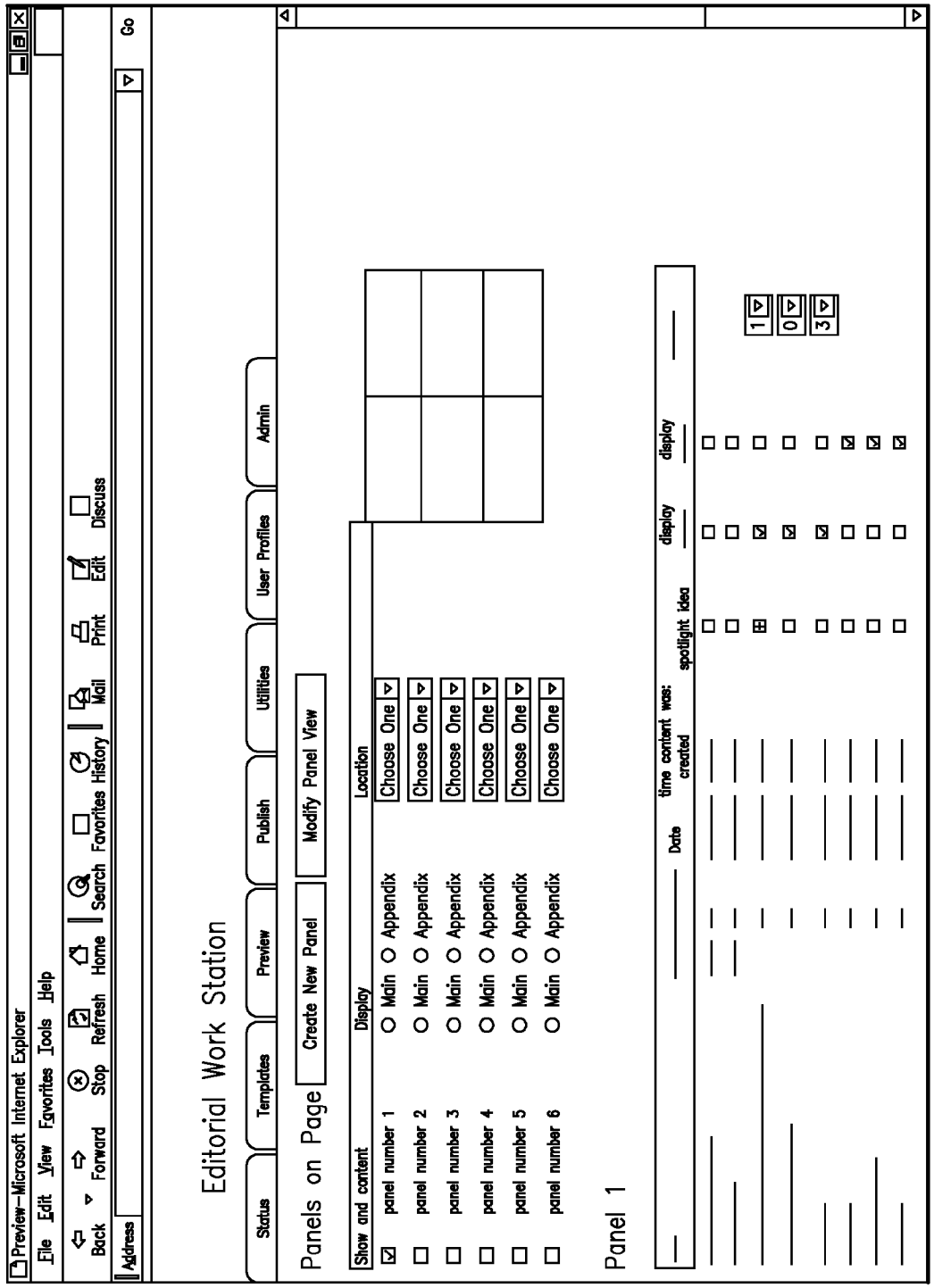
FIG. 5 shows an interface of a preferred embodiment.

The Publish tab. The tab labeled "Publish" provides an interface for the editor, who reviews the article once it is sent to him or her. FIG. 5 shows an example of an interface under this tab. The interface of FIG. 5 provides a layout and publishing queue for the content, and from here, an editor can choose the appropriate panel for the article and any appropriate sub panel arrangement to be displayed in the panel. The interface is interactive as well, and keeps track of time the articles have been published. A default of 30 days provides adequate life for most articles, however, a longer period may be used in some embodiments. Other editing choices are shown as well.

The Preview tab. The tab labeled "Preview" provides an additional content tagging interface. As noted above, in the preferred embodiment, the particular Templates screen will tag the company, sector, and analyst specific information. However, the user has the option of altering or otherwise modifying the tags here. All tagged items from the content authoring interface will remain.

The Utilities tab. The tab labeled "Utilities" provides an interface for rapid content removal from the web site, for compliance or other reasons.

This value added content delivery system will provide contributions to the web site, and turning now to FIG. 6, an example of a home page interface of the preferred embodiment of the web site is seen. This interface offers tabbed access to a number of sub-pages containing categories of facilities and/or information of interest to the financial services professional, including Ideas, Markets, Research, Trading, Tools, Reporting, Products, Events, and Deals. These sub-pages, may be, in the preferred embodiments, comprised of various panels.

Figure 7:
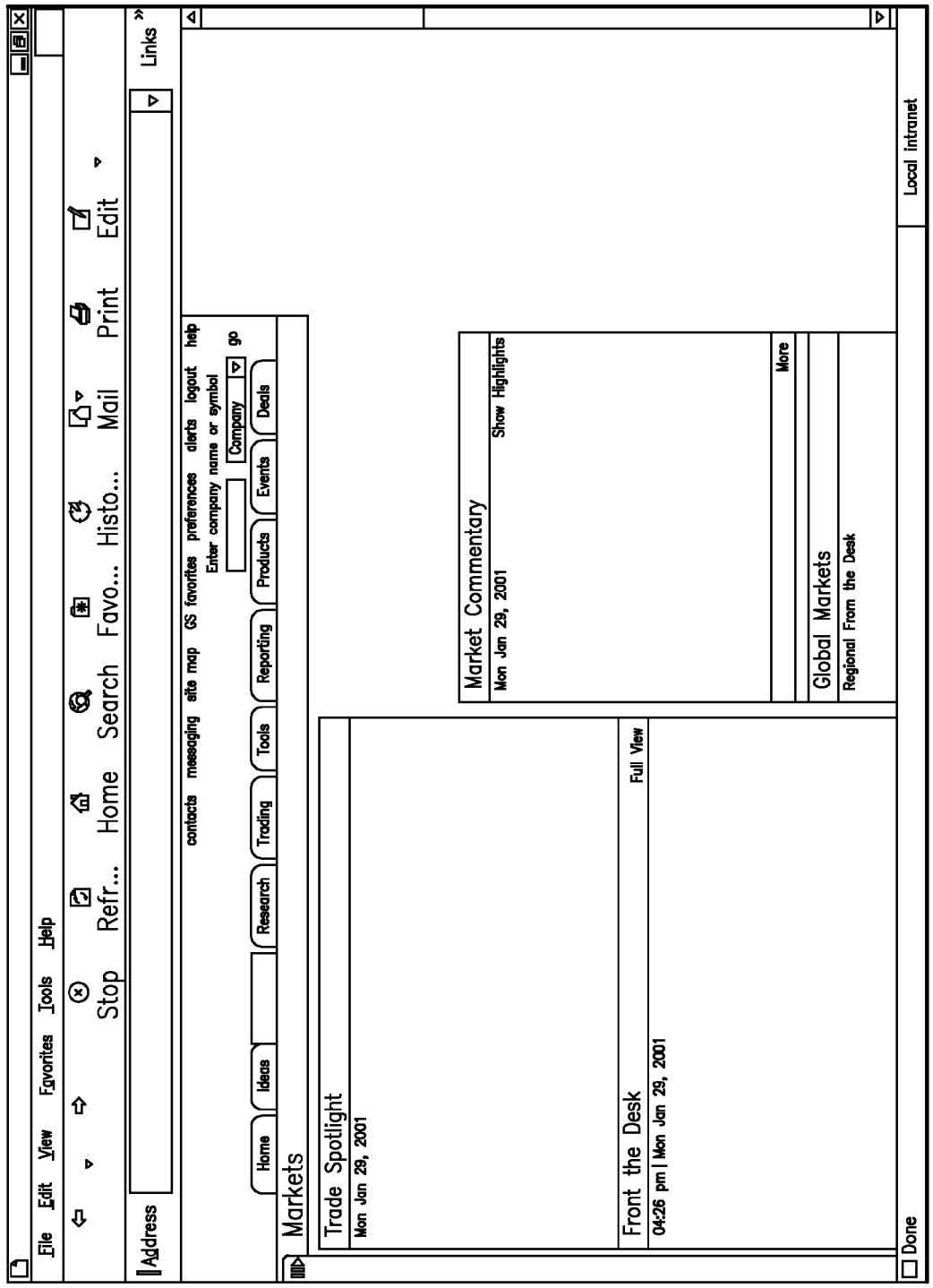
FIG. 7 shows an interface of a preferred embodiment.

Some of the panels of the sub-pages are, in the preferred embodiments, also shown on the home page. For example, the "Market Commentary" panel seen in FIG. 6, is also used on the Markets sub page, as seen in FIG. 7, which is an example of an interface of this page, reached in the preferred embodiments by clicking on the "Market" tab of FIG. 6. The panels for the home page are chosen from a predefined inventory of mandatory and optional panels through a customization process as is further described below.

The home page may be reached by a number of ways. In the preferred embodiments, cookies or other personalization mechanisms residing on the clients system will permit the customization parameters to take effect upon the clients sign on. In the especially preferred embodiments, the customization parameters will be implemented when the client accesses the page through the email interface, as will be further described below. Before turning to the email interface or the customization interface, however, the web site progression of the preferred embodiment will first be described.

As noted above, FIG. 6 shows an example of a preferred embodiment home page interface. Access to a number of sub-pages, including Ideas, Markets, Research, Trading, Tools, Reporting, Products, Events, and Deals, and the panels contained on those pages, is available through the tabs. Access to at least some of these panels is also available through the panels of the home page. So, for example, the Markets Commentary panel may be accessed through either the home page or the Markets sub page, as seen at FIG. 7.

Turning for a moment to the Markets sub page seen in FIG. 7, a number of panels categorizing various data feeds are shown, including stock prices, articles, etc. Two data visualization options are also shown in this page, Watchlist and Mosaic. Both Watchlist and Mosaic are interfaces used to view market data and price performance information for a list of specified symbols or companies. They may be reached, as well though the "Tools" tab of FIG. 6.

The Watchlist will display market, price or other financial instrument information in tabular form with a number of columns representing the different types information, such as market and price data available on a given company. Examples of this data include Price, Net Change, Percent Change, Volume, High, Low, EPS, P/E, and other measurements. The Watchlist, which may be constructed from HTML, Java or other suitable construction, may exist in a number of forms, e.g. as a summary small window, detailed full screen presentation, etc. The stocks shown are chosen during personalization, as will be explained further below. FIG. 8 shows a sample basic Watchlist.

It should be noted that the word "stock" is used throughout, however, the embodiments of the present invention are not limited to monitoring stock information and executing stock transactions. Rather, the embodiments of the present invention include apparatus, methods and articles of manufacture for monitoring financial information and executing financial transactions. Accordingly, any exemplars described herein as monitoring stock information and/or executing stock transactions should be understood as examples only.

Figure 9:
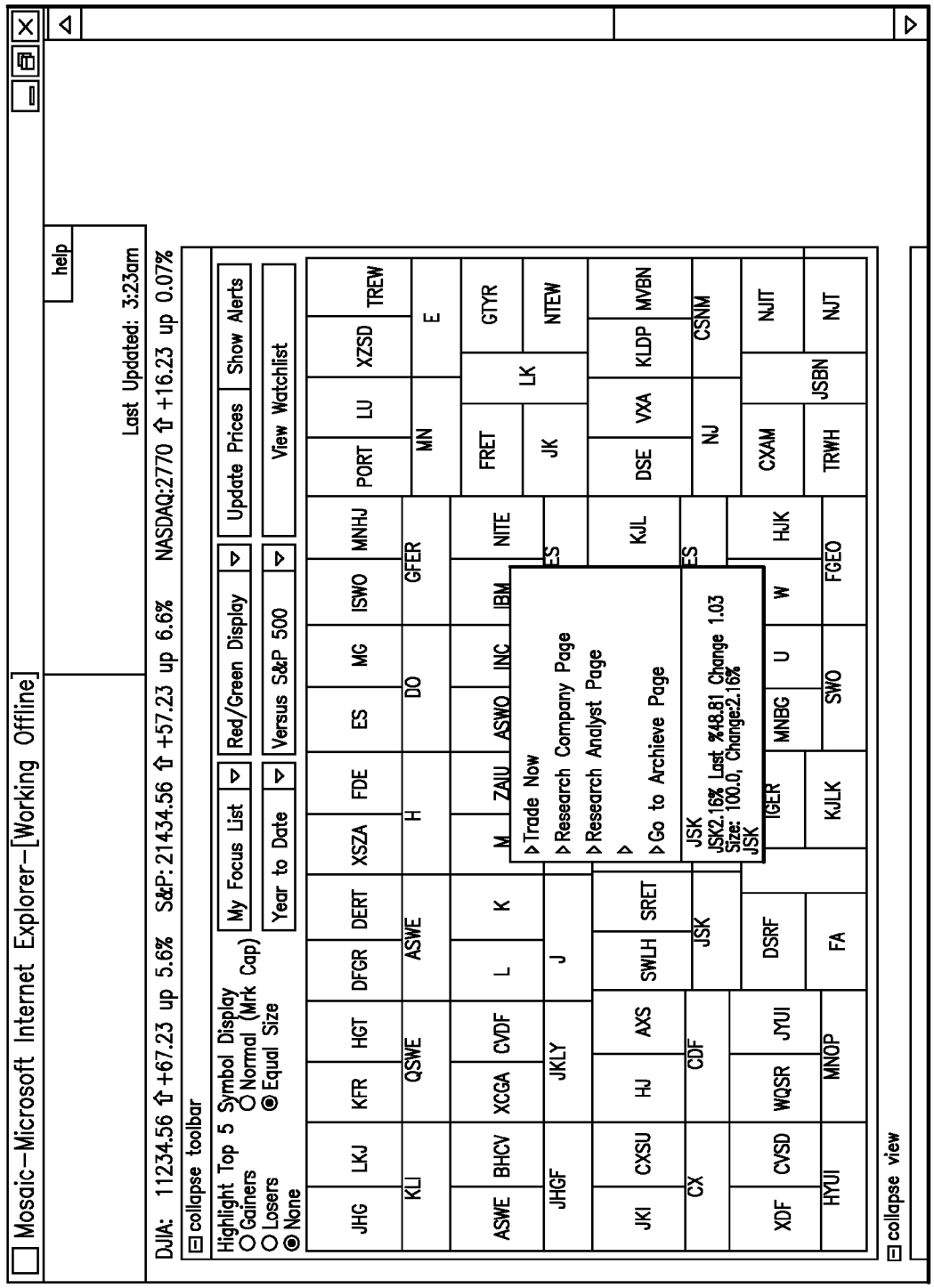
FIG. 9 shows an interface of a preferred embodiment.

The other data visualization option offered in FIG. 7 is Mosaic, which like Watchlist is an interface used to view financial information, e.g., market data and price performance information for a list of specified symbols or companies. In the example shown in FIG. 9, Mosaic provides a color coded tool tracking stock performance. The color and size of the entries or blocks indicate price movement. The user can by clicking on any particular entry, obtain additional information on the stock, if available, as is shown by the expanded block of the Figure. The Mosaic, which may be constructed from HTML, Java or other suitable construction, may exist in a number of forms, e.g. as a summary small window, detailed full screen presentation, etc. The stocks shown are chosen during personalization, and are, in the preferred embodiments, the same as the Watchlist stocks, as will be explained further below.

Figure 10:
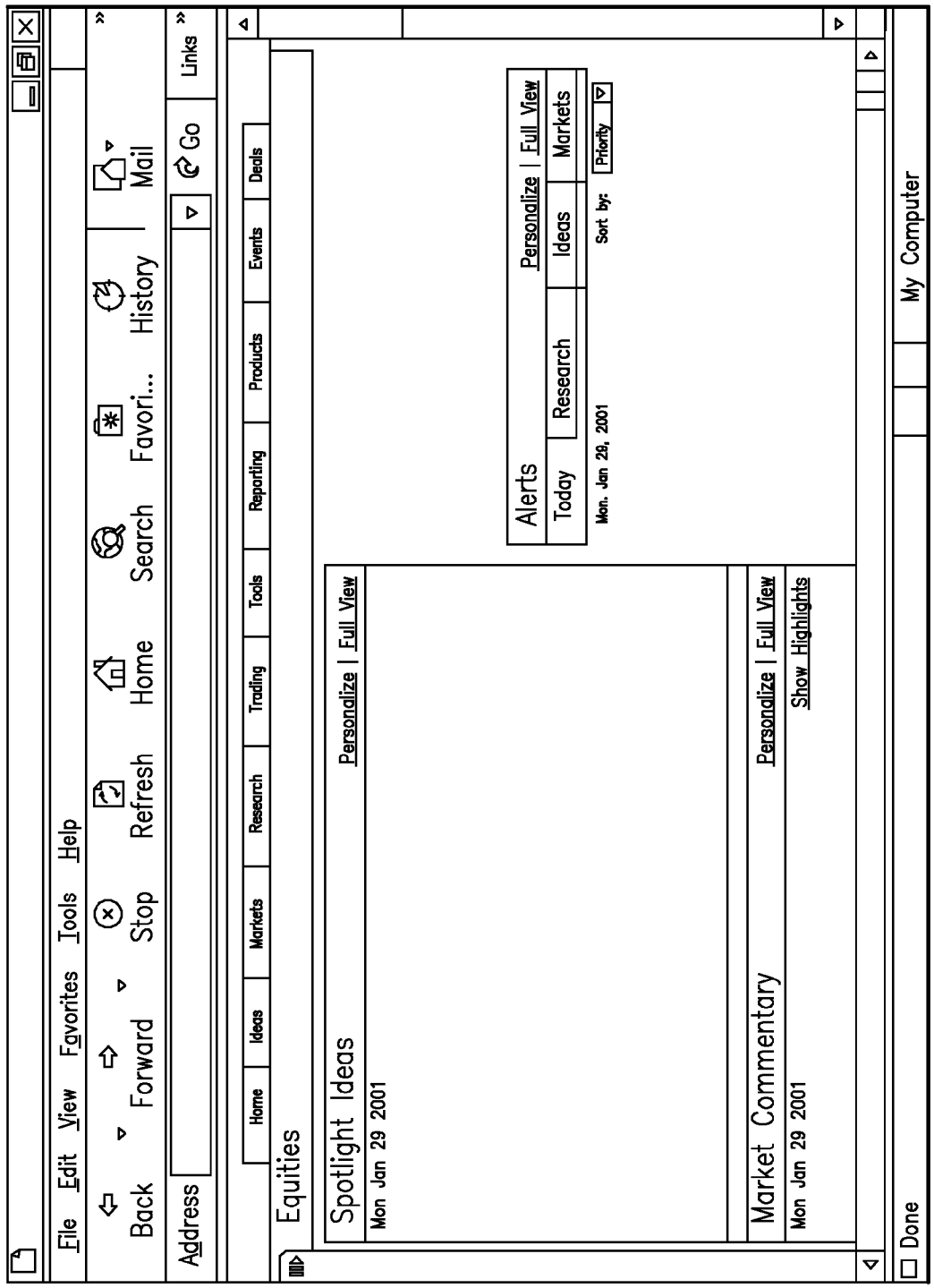
FIG. 10 shows an interface of a preferred embodiment.
Figure 11:
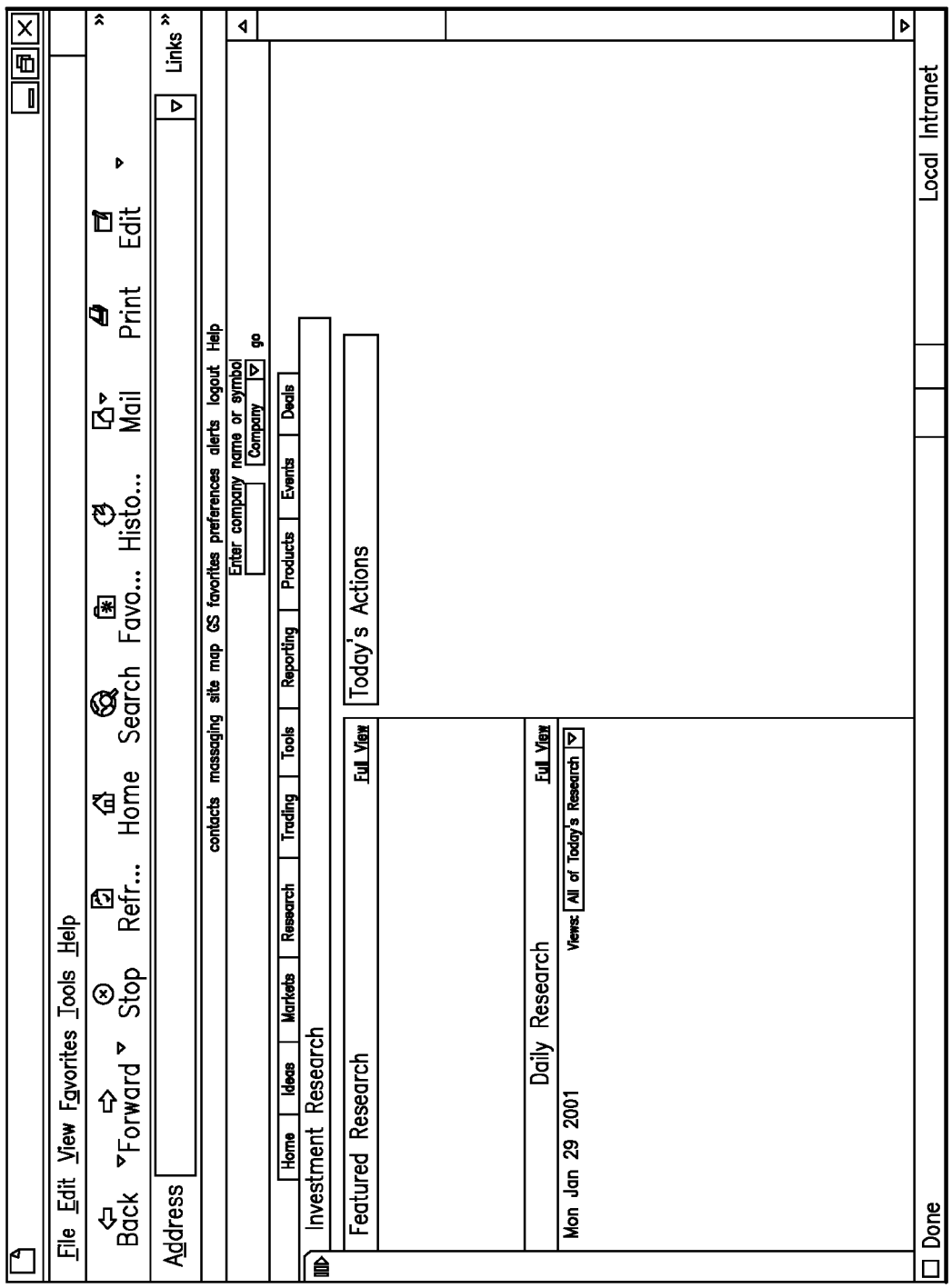
FIG. 11 shows an interface of a preferred embodiment.
Figure 12:
FIG. 12 shows an interface of a preferred embodiment.
Figure 12A:
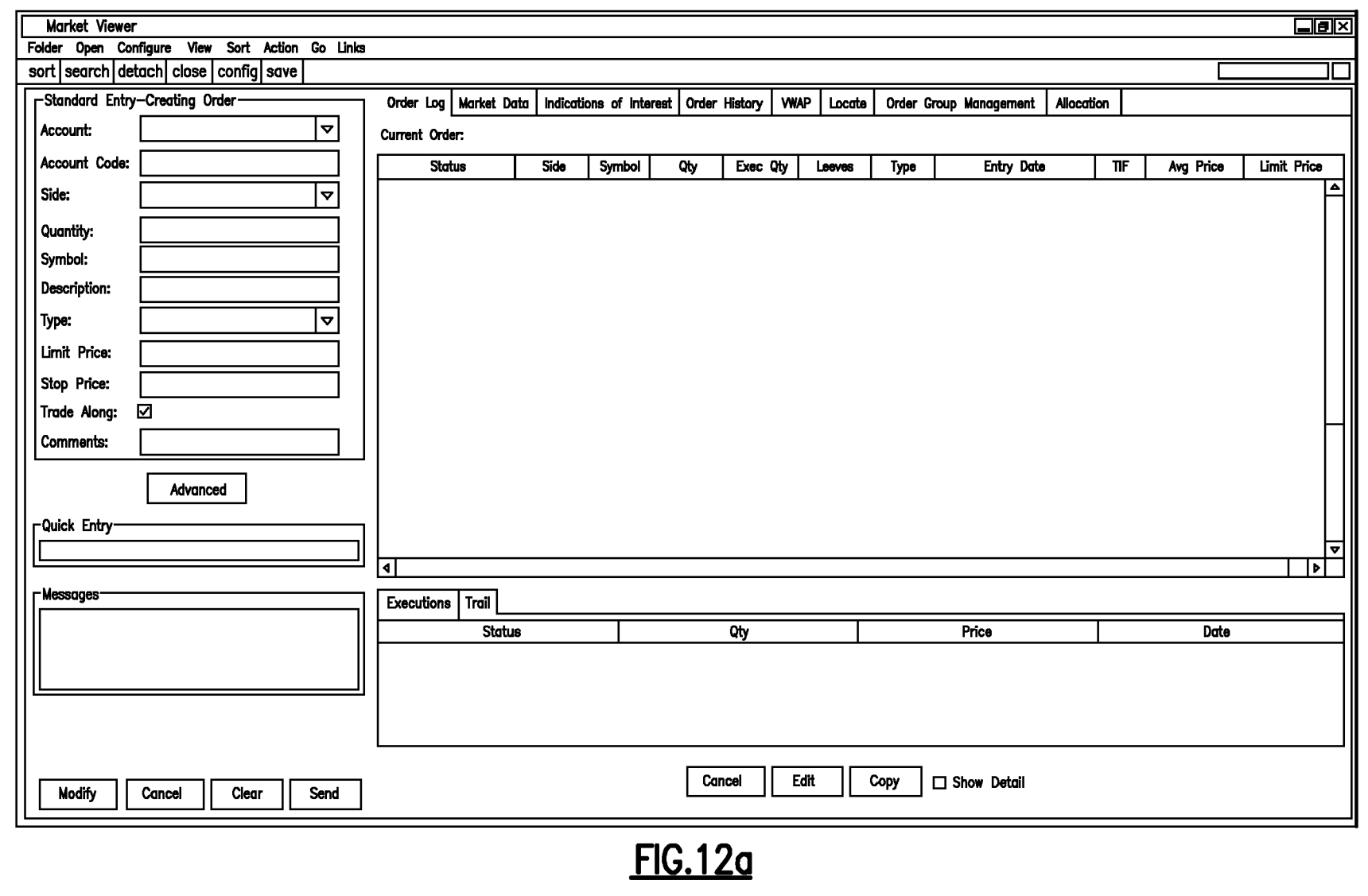
Figure 13:
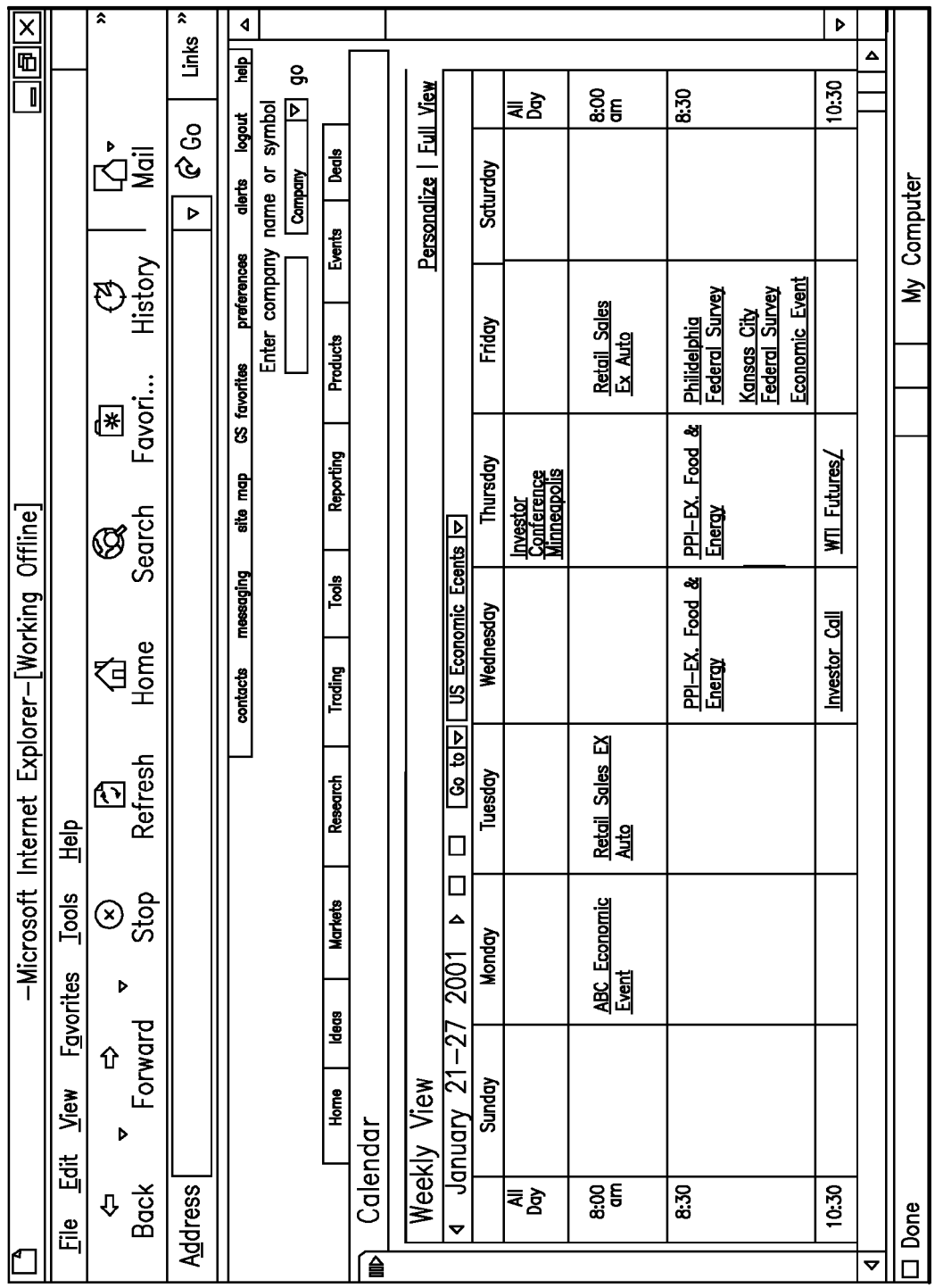
FIG. 13 shows an interface of a preferred embodiment.

Returning now to FIG. 6, the selection of the "Ideas" tab will lead to an interface like that shown in FIG. 10. Various ideas, some general, some targeted according to personalization and some targeted according to investment categories, are shown. The selection of the "Research" tab will lead to an interface like that shown in FIG. 11. Various research alternatives are offered. The selection of the "Trading" tab will lead to an interface like that shown in FIG. 12, as well as open trading facilities. In the especially preferred embodiments these trading facilities include an interface for trading stock through a trading interface, such as that seen at FIG. 12a, which may be a Java applet or other similar mechanism. The selection of the "Events" tab will lead to an interface like that shown in FIG. 13, which offers various upcoming events. The "Reporting," "Products" and "Deals" tabs show some other alternatives that may be used in various examples. Also, a "Portfolio" tab may be used to track financial information as the user desires, including but not limited to specific instruments, bundled instruments or financial sectors.

Figure 14:
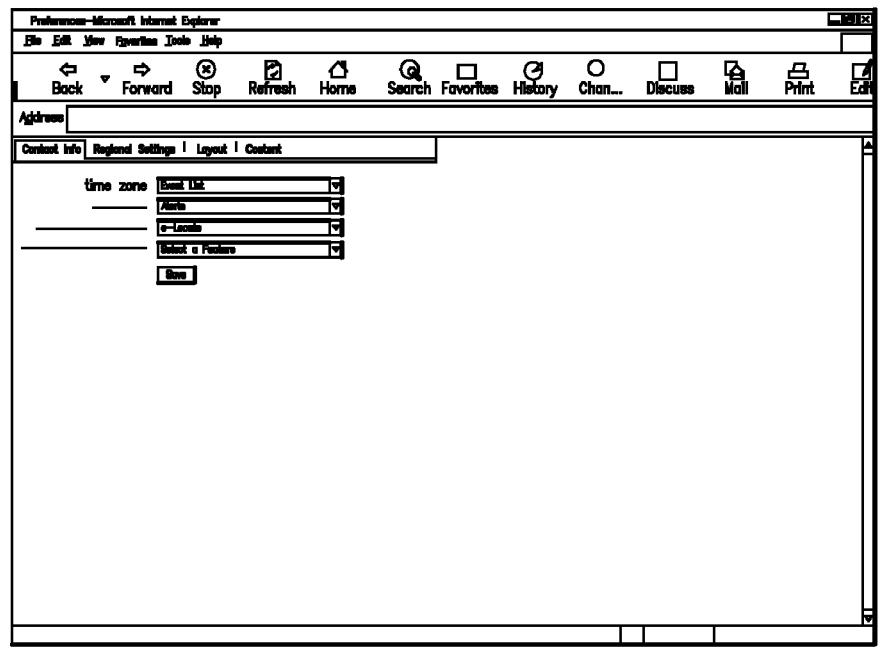
FIG. 14 shows an interface of a preferred embodiment.
Figure 15:
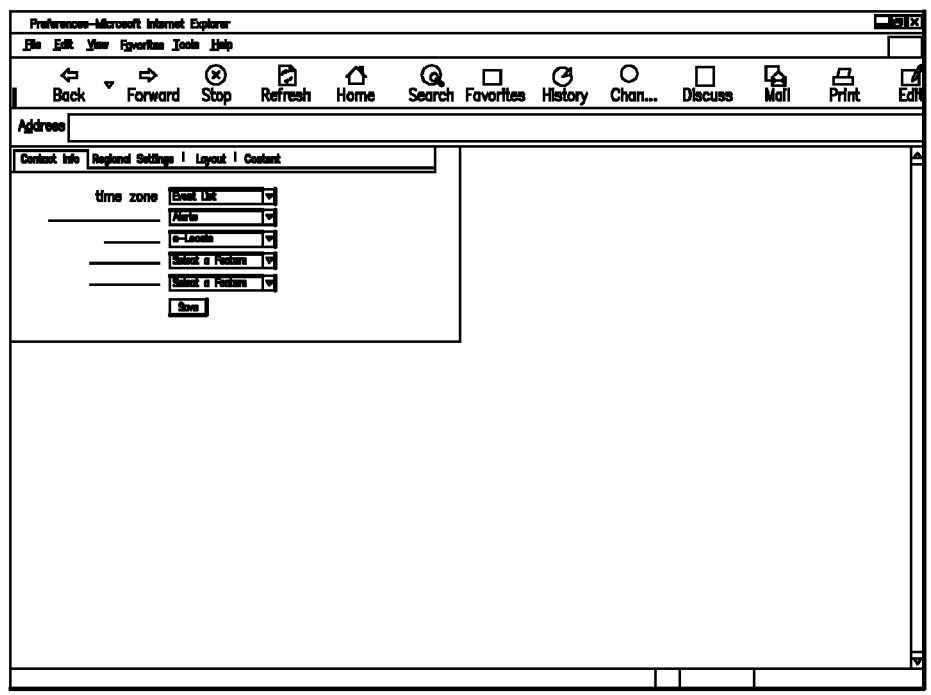
FIG. 15 shows an interface of a preferred embodiment.
Figure 16:
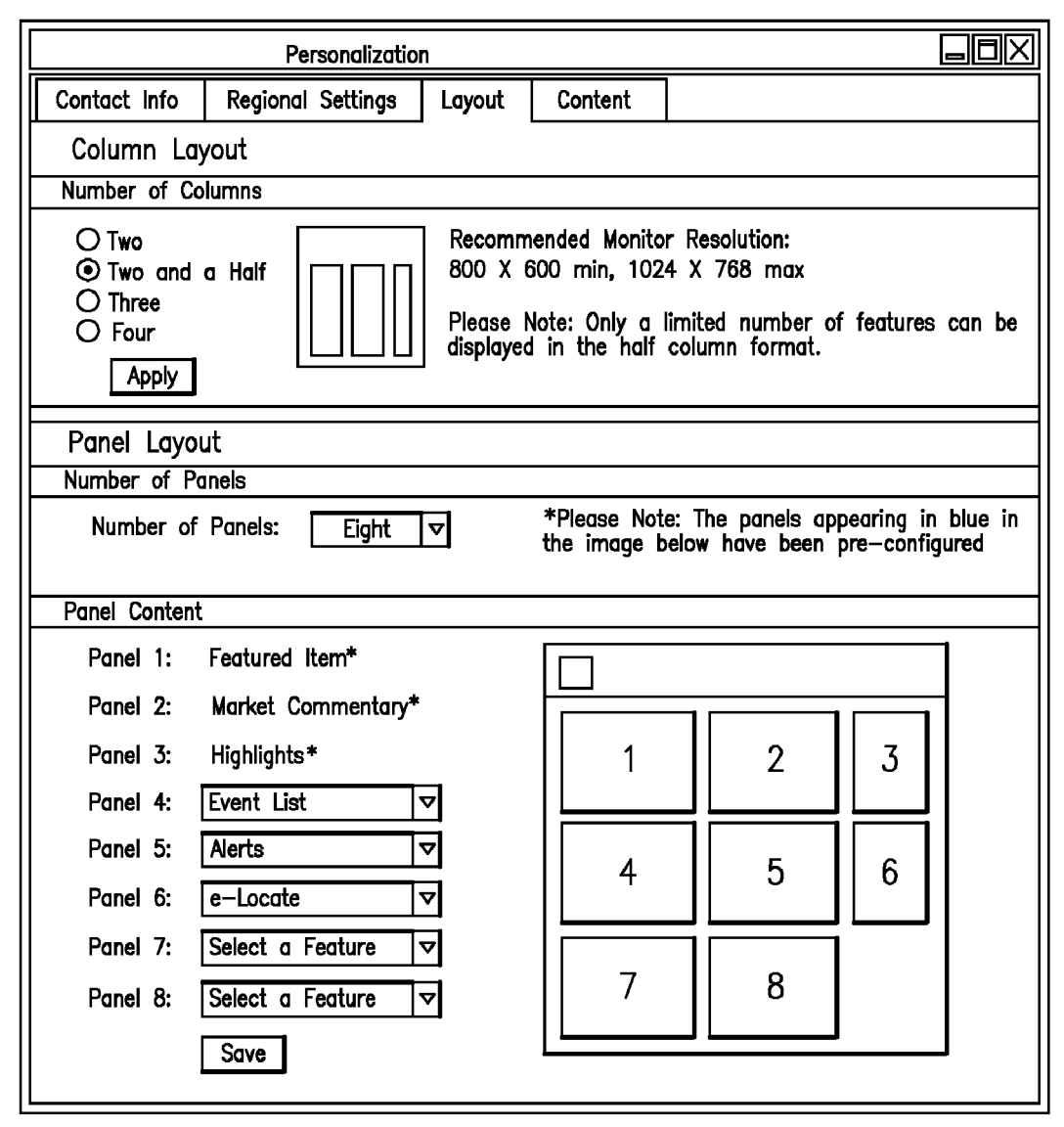
Figure 17:
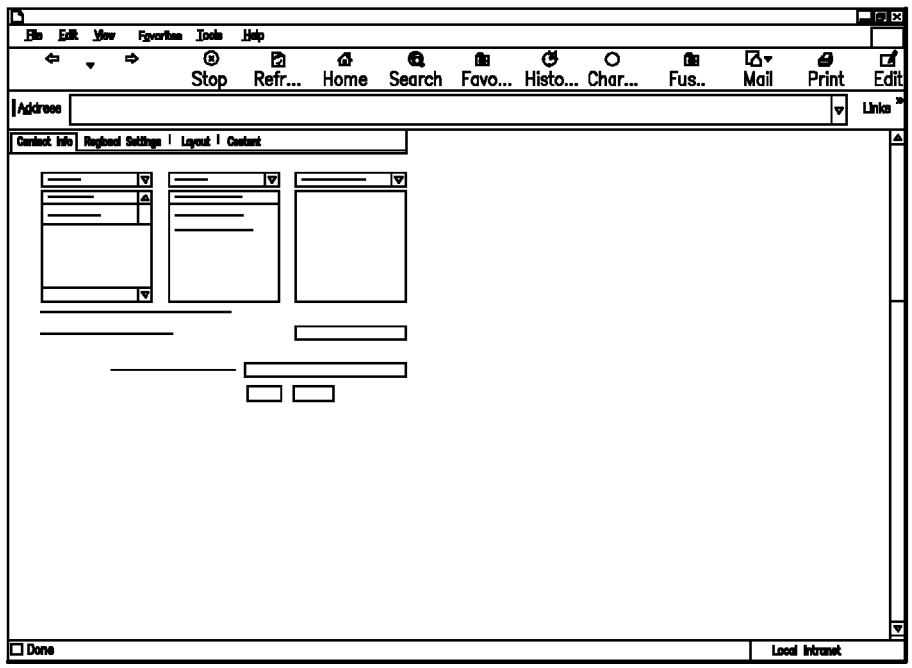
FIG. 17 shows an interface of a preferred embodiment.
Figure 18:
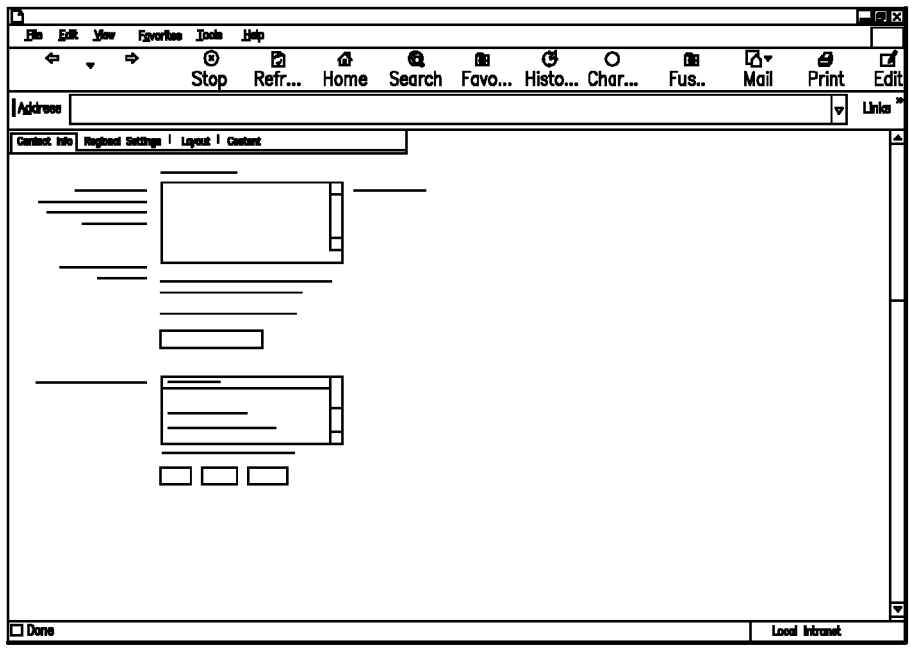
FIG. 18 shows an interface of a preferred embodiment.

Much of the information supplied is chosen according to user personalization or customization, and FIGS. 14-18 show the customization screen used in the preferred embodiments. The various fields to be filled in are seen in the Figures. FIG. 14 shows name and other identification fields. FIG. 15 shows a required time entry. Information provided to the user may be time sensitive, and the Time Zone field seen in this figure defines where the user is located in order to ensure proper delivery of time sensitive information. FIG. 16 shows the column and panel layout the user may configure. In the embodiment of the figure, certain panels may be mandatory, or preconfigured for the user. In this embodiment, the user may select certain content providers, as shown by FIG. 17. Stock and other instruments may be selected as shown at FIG. 18, including choices for Watchlist and Mosaic. The personalization screen permits the creation of a Watchlist as well as use of predetermined Watchlists with predetermined stocks or other predetermined attributes, such as a market index such as the Dow or a proprietary index. The created Watchlist can use tickers typed in by the user or chosen from a predetermined list. The Mosaic uses the same options and will share the same tickers. In other embodiments, the Mosaic and Watchlist may, of course, have different tickers listed.

Personalization may also be accomplished through other methods. Any other method of customization known in the art may be used in this and other embodiments. For example, customization may also depend on the client type, e.g., whether the client is an internal or external Trader, Portfolio Manager or Analyst, and a specific client type may alter the available panels.

Figure 19:
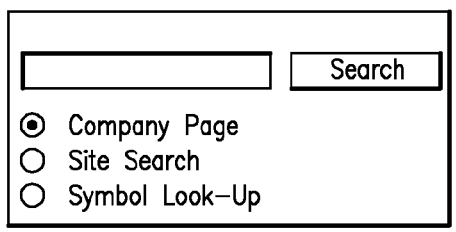
FIG. 19 shows an interface of a preferred embodiment.

Searching is available throughout the site of the contents of the site and FIG. 19 shows a search screen. This search screen permits one of three options: Company Page (the default), Site Search, and Symbol Look-up.

The results of the search will be displayed in a number of formats. If, and assuming the site owner has research facilities for that company, then the research pages will be provided to the user. If the company is not researched by the site owner then the search result will be general market data but with all other fields left blank and a link provided to an external data provider, e.g., www.edgar.gov. FIG. 20 shows a sample result. Results are displayed in Research, Ideas and Markets, formatted by time, title and summary and ordered by most recent.

The GUI described above is one possible interface. Other possible interfaces are the Email interface and the Alerts interface, which will now be described.

Figure 21:
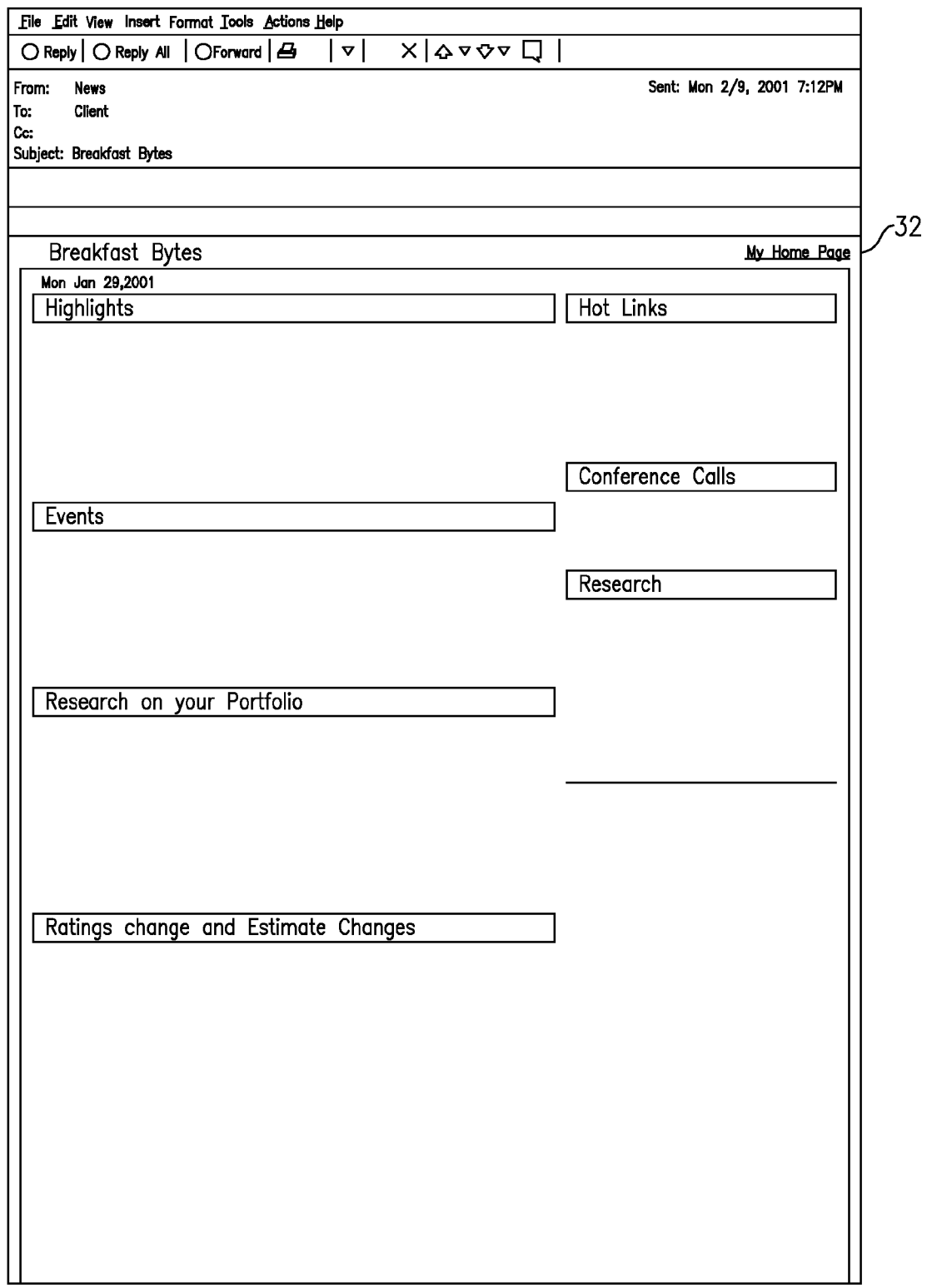
FIG. 21 shows an interface of a preferred embodiment.

The email interface of this embodiment, seen at FIG. 21, shows various panels. The email is HTML formatted in this embodiment. The panels shown are mandatory for the user. Further access to personalized panels is through hyperlink 32 labeled "My Home Page" which provides the user with the option to access his or her personalized home page through a "one click" process from the email. Of course, in other embodiments, customized panels may be offered, as had been described above with regard to Web page customization, and customization of those email panels is done through a similar customization process, with the user indicating those panels he or she is interested in receiving via email.

The Alert interface of this embodiment is shown at FIG. 22. The Alert interface may be integrated within or implemented within the Web site. In some embodiments, Alerts may only be on the Home page, such as that shown in FIG. 6. The interface comprised four tabs (Today, Research, Ideas and Markets) each of which is linked to a further interface. The "Today" tab features all Research, Ideas and Markets Alerts for the given day. The Research, Ideas and Markets tabs features Alerts specific to the respective tab. Alerts are grouped and identified by date published. They are purged on a regular basis, with Ideas and Markets alerts purged after seven days and Research alerts purged after 2 weeks.

When the tabs in the Alerts panel are activated, Research, Ideas and Market items relating to the user's selected portfolio(s) (according to the tags of Industry, Company and Analyst) as defined within their Client Profile.

The alerts comprise headlines, which hyperlink to content. The Research and Ideas alerts will hyperlink to a PDF file or relevant HTML content. The Markets alert will link to a charting tool pre-loaded with the subject company. A News alert may also be present under the Markets tab, and the link, when activated will explodes the news story in a separate reader window.

The user may acknowledge and/or delete alerts. A check box next to each alert allows the user to select an alert after which selection of a link beneath the alerts panel ("acknowledge" and "delete") will perform the respective function. In this and other embodiments, alerts may be delivered to the user as he or she is using the site, by indicating that the user has an alert in a field on any specific web page, e.g., ". . . You have Alerts!"

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. A processing system-implemented method, comprising:
providing via a processor a plurality of financial information data sources to a server side data processing system;
providing a plurality of applications that interact with said plurality of financial information data sources;
receiving at least one customization parameter;
constructing, by said plurality of applications and according to the received at least one customization parameter, a plurality of customized graphical user interface panels from a plurality of non-customized graphical user interface panels that include financial information data from said plurality of financial information data sources;
providing, within a second interface, user selectable options for pre-selecting a plurality of panels from said plurality of non-customized panels;
receiving a plurality of pre-selected panels from said plurality of non-customized graphical user interface panels;
providing said plurality of customized panels and said plurality of pre-selected panels for display by a client side graphical user interface according to the at least one customization parameter;
providing at least one Alert interface according to the at least one customization parameter to present an indication of an alert, the alert received from an alert server; and
displaying, according to the at least one customization parameter, said plurality of customized graphical user interface panels and said plurality of pre-selected graphical user interface panels by said client side graphical user interface, and said Alert interface within said graphical user interface, to present the financial information data from said financial information data sources in a consistent and personalized manner.

2. The method of claim 1 wherein said interface is chosen from the group comprising: a Web page and an email interface.

3. The method of claim 2, wherein said graphical user interface further comprises a Web page.

4. The method of claim 3, wherein said Web page is chosen from the group comprising: Ideas, Markets, Research, Trading, Tools, Reporting, Products, Events, Portfolio and Deals.

5. The method of claim 1 further comprising providing a second plurality of customized panels for display by the second interface.

6. The method of claim 5 wherein said second interface is chosen from the group comprising: a Web page and an email interface.

7. The method of claim 1, wherein the providing a plurality of data sources to a server side data processing system further comprises providing at least some data sources of said plurality through an value added content system.

8. The method of claim 7, wherein the providing at least some data sources of said plurality through an value added content system further comprises:
creating content through a template interface;
editing content through a template interface; and,
publishing content through a template interface.

9. An apparatus for displaying financial information data in a client side data processing system, said apparatus comprising:
a memory;
a processor disposed in communication with said memory, and configured to issue a plurality of processing instructions stored in the memory, wherein the processor issues instructions to:
receive at least one customization parameter;
provide a plurality of financial information data sources from a server side data processing system, with at least some financial information data sources of said plurality being constructed through a value added content system according to the received at least one customization parameter, wherein the value added content system further comprises:
a first template interface for creating content,
a second template interface for editing content, and
a third template interface for publishing content;
construct a plurality of applications that interact with said plurality of financial information data sources and construct a plurality of customized graphical user interface panels using a plurality of non-customized graphical user interface panels that include financial information data from said plurality of financial information data sources;
provide a WEB application graphical user interface comprised of a first plurality of customized panels constructed from the plurality of said non-customized graphical user interface panels;
provide an email application graphical user interface comprised of a second plurality of customized panels constructed from the plurality of said non-customized graphical user interface panels; and
provide an Alert graphical user interface with user selectable options for pre-selecting one or more of said plurality of customized panels and non-customized panels; wherein said pre-selected plurality of customized panels and non-customized panels are displayed, at least in part, on either one of said WEB application or email application graphical user interfaces to present Alert data from said plurality of financial information data sources in a consistent and personalized manner according to the at least one customization parameter.

10. The apparatus of claim 9, wherein said interface further comprises a Web page.

11. The apparatus of claim 10, wherein said Web page is chosen from the group comprising: Ideas, Markets, Research, Trading, Tools, Reporting, Products, Events, Portfolio and Deals.

12. A processing system-implemented method for providing a customized financial information interface, said method comprising:
receiving in a storage element and processing via a processor at least one user customization parameter;
providing a plurality of financial information sources to a server side data processing system;
providing a plurality of applications that interact with said plurality of financial information sources;
constructing, by said plurality of applications and according to the received at least one user customization parameter, a plurality of customized graphical user interface panels from a plurality of non-customized graphical user interface panels that include financial information from said plurality of financial information sources;
providing, within a second interface, user selectable options for pre-selecting a plurality of panels from said plurality of non-customized panels;
receiving a plurality of pre-selected panels from said plurality of non-customized graphical user interface panels;
providing said plurality of customized panels and said plurality of pre-selected panels for display by a client side graphical user interface;

providing at least one Alert interface according to the at least one customization parameter to present an indication of an alert received from an alert server; and displaying said plurality of customized graphical user interface panels and said plurality of pre-selected graphical user interface panels by said client side graphical user interface, and said Alert interface within said graphical user interface according to the received at least one user customization parameter, to present the financial information from said financial information sources in a consistent and personalized manner.

13. A non-transitory processor-readable medium having processor-executable program instructions residing thereon, wherein the processor-executable program instructions are issuable by a processor to:

provide a plurality of financial information data sources to a server side data processing system;

provide a plurality of applications that interact with said plurality of financial information data sources;

receive at least one customization parameter;

construct, by said plurality of applications and according to the received at least one customization parameter, a plurality of customized graphical user interface panels from a plurality of non-customized graphical user interface panels that include financial information data from said plurality of financial information data sources;

provide, within a second interface, user selectable options for pre-selecting a plurality of panels from said plurality of non-customized panels;

receive a plurality of pre-selected panels from said plurality of non-customized graphical user interface panels;

provide said plurality of customized panels and said plurality of pre-selected panels for display by a client side graphical user interface according to the at least one customization parameter;

provide at least one Alert interface according to the at least one customization parameter to present an indication of an alert, the alert received from an alert server; and display, according to the at least one customization parameter, said plurality of customized graphical user interface panels and said plurality of pre-selected graphical user interface panels by said client side graphical user interface, and said Alert interface within said graphical user interface, to present the financial information data from said financial information data sources in a consistent and personalized manner.

14. The processor-readable of claim 13 wherein said interface is chosen from the group comprising: a Web page and an email interface.

15. The processor-readable medium of claim 14, wherein said graphical user interface further comprises a Web page.

16. The processor-readable medium of claim 15, wherein said Web page is chosen from the group comprising: Ideas, Markets, Research, Trading, Tools, Reporting, Products, Events, Portfolio and Deals.

17. The processor-readable medium of claim 13, further comprising processor-issuable instructions to provide a second plurality of customized panels for display by the second interface.

18. The processor-readable medium of claim 17 wherein said second interface is chosen from the group comprising: a Web page and an email interface.

19. The processor-readable medium of claim 18, wherein the processor-issuable instructions to provide a plurality of data sources to a server side data processing system further comprises instructions to provide at least some data sources of said plurality through an value added content system.

20. The processor-readable medium of claim 19, wherein the processor-issuable instructions to provide at least some data sources of said plurality through an value added content system further comprises instructions to:

create content through a template interface;

edit content through a template interface; and, publish content through a template interface.

* * * * *